H. F. KNAPP.

MEANS FOR RAISING SUNKEN VESSELS.

No. 6,934. Reissued Feb. 15, 1876.

Witnesses:
Michael Ryan
Fred Haynes

H. F. Knapp
by his Attorneys
Brown & Allen.

N. PETERS, PHOTO-LITHOGRAPHER, WASHINGTON, D. C.

UNITED STATES PATENT OFFICE

HENRY F. KNAPP, OF NEW YORK, N. Y.

IMPROVEMENT IN MEANS OF RAISING SUNKEN VESSELS.

Specification forming part of Letters Patent No. 133,863, dated December 10, 1872; reissue No. 6,934, dated February 15, 1876; application filed February 10, 1876.

*To all whom it may concern:*

Be it known that I, HENRY F. KNAPP, of the city, county, and State of New York, have invented a new and useful Process of Relieving and Removing or Raising Stranded and Sunken Vessels; and I do hereby declare that the following is a full, clear, and exact description of the same, reference being had to the accompanying drawing forming part of this specification, and in which—

Figure 1:
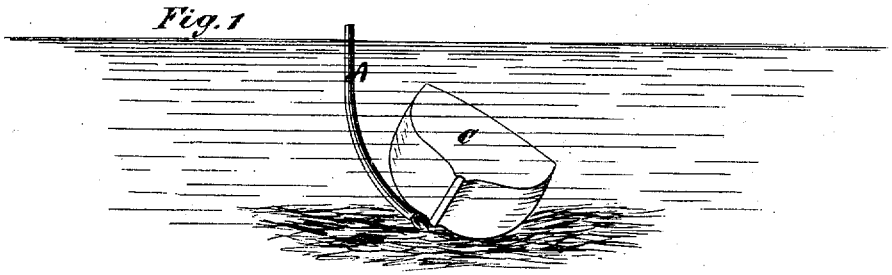
Figure 2:
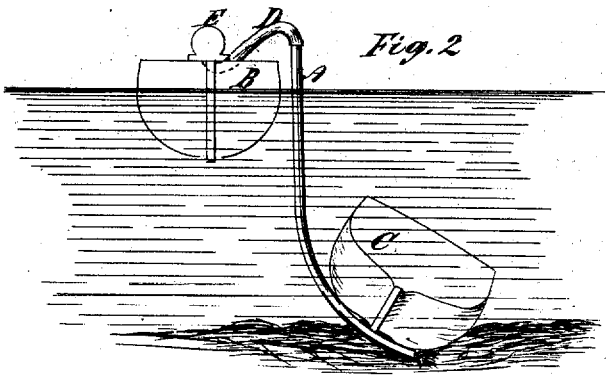
Figure 4:
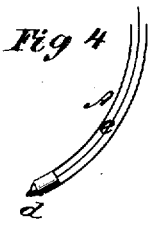
Figure 3:
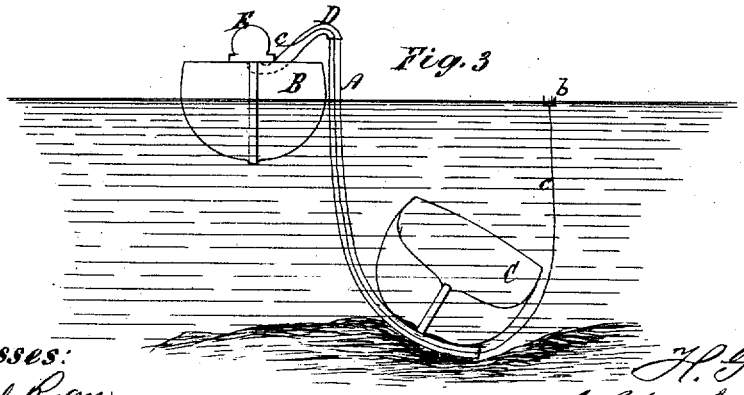

Figures 1, 2, and 3, represent various stages in the operation of relieving and raising a sunken vessel according to my improved process; and Fig. 4 a view of a torpedo device or contrivance that may be used in carrying said process into effect.

Similar letters of reference indicate corre sponding parts.

This invention generally consists in a novel process or method of relieving and removing or raising stranded and sunken vessels, by manipulating or projecting one or more pipes down the side of the wreck, the upper end of each of said pipes being connected with a pump, so that a stream of air or water is forced down through the pipe to loosen or wash away the sand or mud in which the wreck lies, in order that the pipe, by suitable manipulation, may be made to cut its way beneath the wreck. This relieves the vessel from its hold in the mud or sand by loosening or washing away the latter from beneath and outside of it, so that a continuous film of fluid is maintained between the outside of the vessel and the sand or mud, to facilitate the removal of the vessel. After this has been done, should it be necessary to apply mechanical means to raise the vessel which has been relieved, a carrier float or ball of less specific gravity than the water, and having a light cord attached to it, is washed or forced by the pump through the pipe, and, ascending on the opposite side of the wreck to that down which the pipe was projected, affords a ready means for drawing a stouter cord, and so on for any number of increasing stronger cords or ropes in succession, until a chain of suitable strength may be hauled by the last cord or rope beneath and around the vessel, to obtain a lift from opposite sides of it, the pipe being removed before passing the chain. Any number of chains may thus be passed to hug the hull at different points in the length of it, and any desired lifting-force applied to their ends to raise the vessel. In case of the carrier-float having the primary cord attached to it not being able to rise after its projection from the pipe by reason of mud or sand overlying it, then a rod, cord, or wire having a torpedo attached, is passed down the pipe and exploded beyond the lower end of the latter, to clear or form a passage for the carrier-float with its attached cord.

A is the pipe, which may be of any desired shape, and which is manipulated or steered from a floating raft or vessel, B, till it is projected into the sand or mud close up alongside of the wreck C. Said pipe is connected by a hose, D, at its upper end with any suitable pump, E, on board the vessel B, for the purpose of passing a stream of water down through the pipe, in order that the mouth or lower end of the latter may, by the manipulation of the pipe, easily cut its way through the sand and mud, both of which are driven out of the pipe A, and the latter in due course caused to reach under the keel of the wreck, as represented in Fig. 2, which position may be determined by the bubbling of the water on the opposite side of the wreck, or with greater certainty by forcing a little oil with the water down through the pipe, or by entirely stopping the supply of water to or through the pipe, and substituting therefor a strong blast of air, which will readily rise through the mud and sand; but one result accomplished by the forced and continuous current through the pipe A, is to loosen or wash away the sand or mud from under and about the wreck, thereby relieving the latter. The pump on board the vessel B is then stopped, and the hose D taken off, and a small carrier-float or light ball, *b*, having attached to it a long piece of twine, *c*, introduced freely within the pipe from above, the ball *b* making a close but easy fit within the pipe, and the outer end of the twine being passed through a small side opening in the pipe, or, preferably, in the detached rubber hose D. The hose D is then reconnected with the pipe A, and a full blast of air or flow of water put on. This causes the ball *b* to be driven through the pipe A and out of its lower end or mouth into the sand or mud, and, in due course, by the continued operation of the pump, working the ball, which may be of cork or other material of less specific gravity than water, up through the sand or mud on the opposite side of the wreck, till it floats on the top of the water, as illustrated in Fig. 3.

In case the ball *b* is prevented by the mud and sand from rising after leaving the pipe A by the force of the blast or flow of water down through the pipe, its upward passage through the mud or sand may be effected or facilitated by introducing down the pipe A a small percussion or fuse torpedo, *d*, by means of a rod or wire, *e*, till it passes out of the lower end of the pipe A within the sand or mud, when said torpedo is exploded, and the ball *b*, with the one portion of its twine *c*, caused to rise to the surface of the water, to be subsequently hauled upon. The twine *c* being thus arranged on both sides of the wreck, as well as beneath it, and with both ends accessible from above the water, a stouter piece of cord is next attached to the one end of the twine *c* and drawn through the pipe A and up around the wreck by pulling on the ball *b* and twine, and so on in succession, if necessary, for any number of cords of increasing thickness, till a cord or rope of sufficient strength is passed down beneath and up around the wreck to form a means for similarly drawing a heavy chain cable of the desired strength to raise the wreck, the pipe A in the meantime having been removed, leaving the cord or rope, and, subsequently, the chain, in suitable position under the keel. These operations are repeated at different points or distances throughout the length of the wreck until a sufficient number of chain cables are placed under the latter to raise it, which cables may be attached to timbers and floats on the surface of the water to lift the wreck.

What is here claimed, and desired to be secured by Letters Patent, is—

1. The method herein described of relieving and removing vessels embedded in sand or mud by means of one or more pipes projected or manipulated beneath the wreck or vessel, in combination with a pump connected with said pipe above and operating to force a current of air or water down and out through said pipe, whereby the sand or mud is loosened or washed away from the outside of and beneath the vessel, substantially as specified.

2. The means, substantially as herein described, of passing cables under sunken vessels, consisting of a tube, A, and flexible pipe D, the force-pump E, and float *b*, with its attached cord *c*, for operation substantially as specified.

3. The torpedo *d*, having an attached rod, cord, or wire, *e*, in combination with the pipe A, essentially as described.

HENRY F. KNAPP.

Witnesses:
MICHAEL RYAN,
FRED HAYNES.